United States Patent [19]

Sugiyama

[11] Patent Number: 5,317,456

[45] Date of Patent: May 31, 1994

[54] METHOD AND APPARATUS FOR RECORDING SIGNALS WITH DIFFERENT RECORDING CURRENT LEVELS TO DETERMINE OPTIMUM RECORDING CHARACTERISTICS

[75] Inventor: Katsuhiro Sugiyama, Chiba, Japan

[73] Assignee: Sony Corporation, Tokyo, Japan

[21] Appl. No.: 967,429

[22] Filed: Oct. 28, 1992

[30] Foreign Application Priority Data

Nov. 8, 1991 [JP] Japan .................................. 3-319731

[51] Int. Cl.⁵ ............................................. G11B 5/09
[52] U.S. Cl. ........................................ 360/46; 360/51; 360/53
[58] Field of Search ................ 360/46, 31, 40, 51, 360/45, 65, 66, 67, 68, 70.1, 77.1, 42; 369/32, 100

[56] References Cited

U.S. PATENT DOCUMENTS

| | | | |
|---|---|---|---|
| 3,798,673 | 3/1974 | Kounuma | 360/66 |
| 4,297,730 | 10/1981 | Kadowaki et al. | 360/66 |
| 4,338,639 | 7/1982 | Fujibayashi | 360/66 |
| 4,405,953 | 9/1983 | Inomata et al. | 360/68 |
| 4,611,253 | 9/1986 | Kamei et al. | 360/66 |
| 4,908,722 | 3/1990 | Sonobe | 360/65 X |
| 4,967,289 | 10/1990 | Kanota et al. | 360/46 |
| 5,077,623 | 12/1991 | McSweeney | 360/31 |
| 5,157,513 | 10/1992 | Yamashita | 369/53 X |

FOREIGN PATENT DOCUMENTS

| | | | |
|---|---|---|---|
| 0316758 | 5/1989 | European Pat. Off. | |
| 0425064 | 5/1991 | European Pat. Off. | 360/46 |

*Primary Examiner*—Donald Hajec
*Assistant Examiner*—Le Thien Minh
*Attorney, Agent, or Firm*—William S. Frommer; Alvin Sinderbrand

[57] ABSTRACT

A reference signal is recorded in different locations on a record medium with a controllable recording current level that is changed when the reference signal is recorded in such different locations. Location signals representing those different locations at which the reference signal is recorded also are generated and they too are recorded. Thereafter, the reference and location signals are reproduced from the different locations and stored. The stored reference signal whose signal level is the largest is detected and the location signal representing the particular record medium location at which that reference signal was recorded is identified. The recording current level which was used to record the reference signal at that particular location is determined. This determined recording current level may be used subsequently to record a signal, such as a video signal, with optimum characteristics.

48 Claims, 4 Drawing Sheets

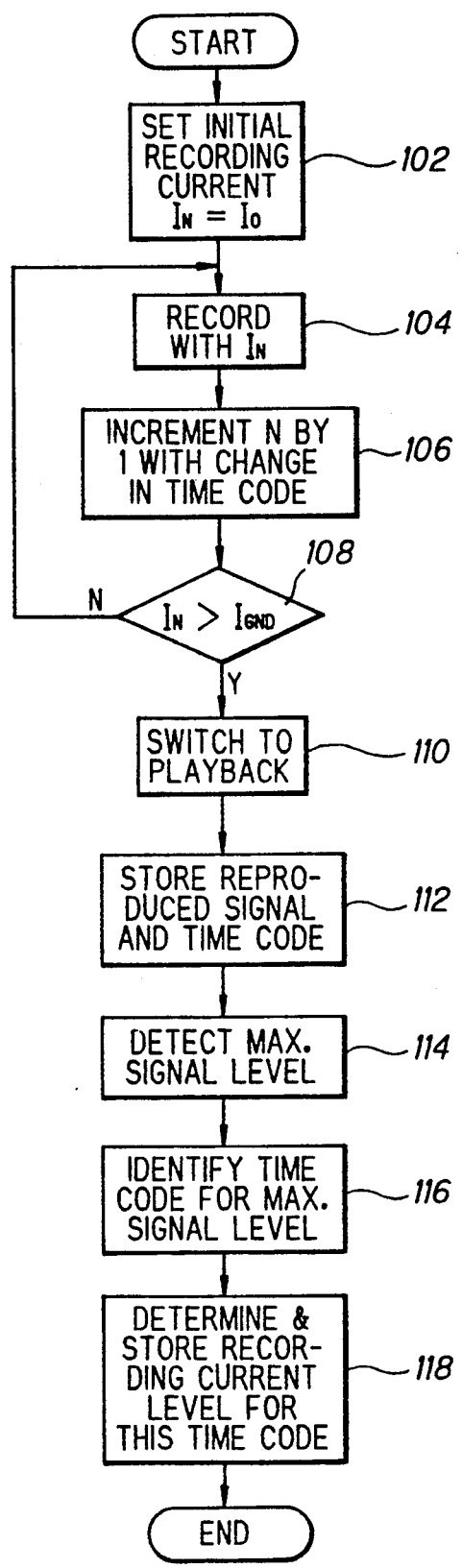

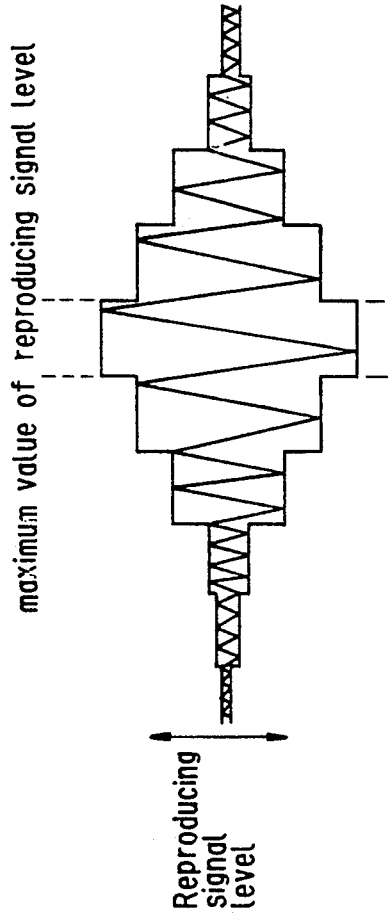
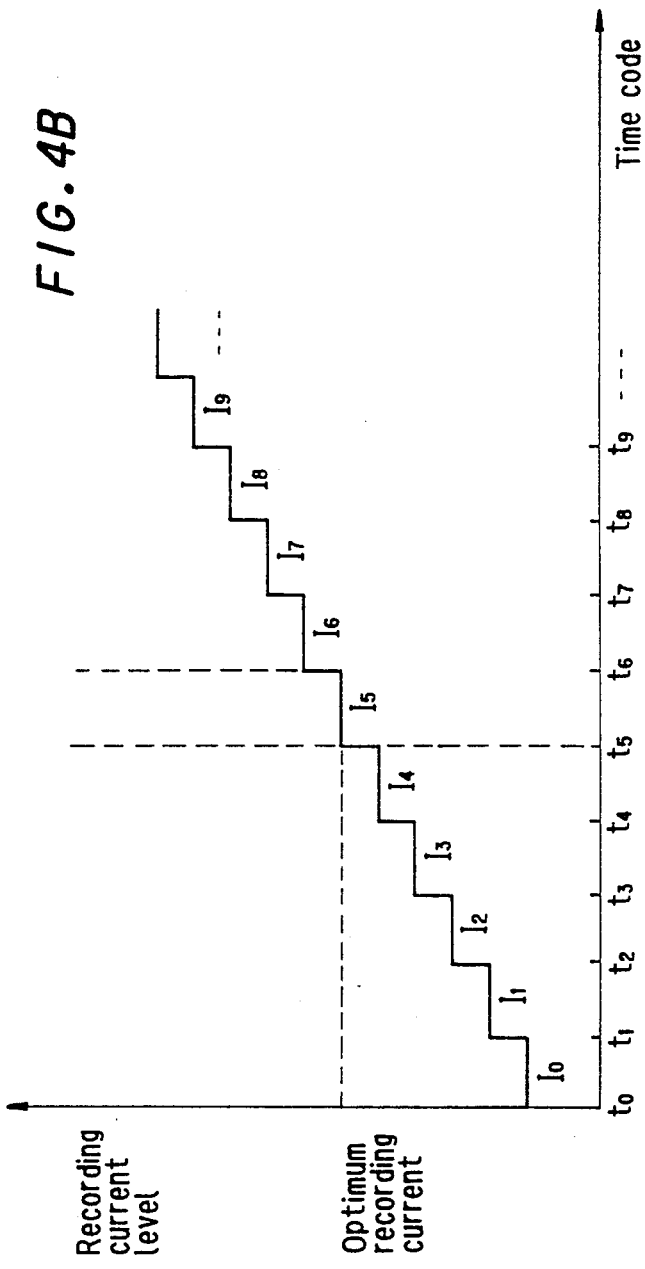
FIG. 4A
FIG. 4B

METHOD AND APPARATUS FOR RECORDING SIGNALS WITH DIFFERENT RECORDING CURRENT LEVELS TO DETERMINE OPTIMUM RECORDING CHARACTERISTICS

BACKGROUND OF THE INVENTION

This invention relates to the recording of signals on a recording medium, such as video signals on a magnetic tape, and more particularly, to such technique which identifies an optimum recording current level such that video signals may be recorded with high signal-to-noise ratios, thereby permitting a wider band of high frequencies to be used while producing video pictures with good quality.

The quality of an information signal that is recorded on a record medium, such as the signal-to-noise (S/N) ratio, often is a function of the current level with which the signal is recorded. This factor is particularly pronounced in the recording of signals on a magnetic record medium, and especially the recording of video signals in slant tracks on a video tape recorder (VTR). Often, the recording current level that may be set by, for example, the recording amplifier, results in different recording characteristics because the properties of the recording transducer, or magnetic head, vary from one device to another. Thus, the setting of a particular current level by a recording amplifier may result in a record signal of optimum parameters when that signal is recorded by one head, but less than optimum parameters when that same signal is recorded by another. To account for such disparities from head to head, it is conventional to rely upon skilled technicians to set the final adjustment in the recording current level, as by setting the gain of the recording amplifier, as the final step in manufacturing a VTR. This labor-intensive procedure is carried out by recording signals with different current levels, or amplifier gain, observing those signals, reproducing those signals, and then measuring the level of the reproduced signals. The recording current level, or gain, of the recording amplifier then is set to the recording current level or gain that had been used to record the signal which the technician observes as having the highest playback level.

This procedure often is inaccurate, is subject to a wide variety of subjectivity by the technician and adds significantly to the overall expense of the VTR. Moreover, the signal level of a signal that is reproduced from a magnetic medium is not dependent solely upon the recording current level that was used during recording. The type and quality of the magnetic medium influences the reproduced signal level so that even if an optimum recording current level is set in the aforementioned manner, that level may not produce optimum results when the VTR is used with a magnetic medium that differs from the medium which was used by the technician.

Although it is possible for the end user of the VTR to carry out the aforementioned procedure of optimizing the recording current level before the VTR is used, it is desirable not to place such a burden, on the user, particularly if the VTR is intended for consumer use. Furthermore, since the VTR may be used with magnetic media of different qualities and types from one recording session to another, thus requiring the optimizing step to be carried out for each magnetic tape that is used, the prospect of having the optimizing step carried out by the VTR user clearly is unattractive.

OBJECTS OF THE INVENTION

Therefore, it is an object of the present invention to provide a technique for determining the optimum recording characteristics, particularly the recording current level, for recording a signal, such as a video signal, on a record medium.

Another object of this invention is to provide a technique of the aforementioned type, whereby an optimum recording parameter is determined quickly and automatically and may be used by the end user of the recording apparatus with which this technique is employed.

A further object of this invention is to provide a technique of the aforementioned type which may be incorporated into a video tape recorder, thereby reducing the overall cost of manufacturing the VTR.

An additional object of this invention is to provide apparatus for determining an optimum recording parameter for the recording of signals on a record medium, and which may be incorporated into a VTR, such as an 8 mm video recorder.

Various other objects, advantages and features of the present invention will become readily apparent from the ensuing detailed description, and the novel features will be particularly pointed out in the appended claims.

SUMMARY OF THE INVENTION

In accordance with this invention, a technique is provided for determining an optimum recording parameter with which signals are recorded on a record medium. A reference signal is supplied to a recording amplifier which is controlled so as to change the recording current level of the reference signal as that signal is recorded in different locations on the record medium. Location signals representing the locations on the record medium whereat such reference signal is recorded is generated and also recorded.

In one embodiment, the reference signal is reproduced from such different locations on the record medium as are the location signals. The reproduced reference and location signals are stored; and the stored reference signal having the largest signal level is detected. The location signal which represents the particular location on the record medium at which the reference signal having the largest signal level is recorded is identified and the recording current level that had been used to record the reference signal at that particular location is determined.

In the preferred embodiment, the reference signal is recorded with different recording current levels in different tracks and, preferably, such tracks are slant tracks. Preferably, although not necessarily, the location signals are recorded in the same tracks as the reference signal. As one example, the location signals are time code signals; and as another example, the location signals are address signals.

The reference signal which is recorded as aforementioned is generated by a reference signal generator. A video reference signal, such as a color bar or predetermined video pattern, may be supplied as the reference signal.

The recording current level with which the reference signal is recorded is changed monotonically and, preferably, over a predetermined range. In one embodiment, a variable gain amplifier is used to record the reference signal; and the gain of this amplifier is changed as the reference signal is recorded in successive tracks. In a preferred embodiment, the location signals are time code signals which change from track to track, and the gain of the recording amplifier is changed as the time code signals change.

Preferably, a current level indicating signal indicative of the recording current level that has been determined to be the optimum level is stored and is used in subsequent recording operations to set the recording current level. For example, the current level indicating signal may be used to set the gain of the recording amplifier. In one example, the current level indicating signal is recorded on the record medium for which the optimum recording parameter had been determined so that this same parameter may be set when the record medium next is used for a recording operation. Thus, in a subsequent recording operation, an input video signal may be supplied for recording on the record medium; and the gain of the recording amplifier is set in response to the current level indicating signal such that the input video signal is recorded with an optimum recording parameter.

In a preferred embodiment, a control unit, such as a CPU, operates to detect the stored, reproduced reference signal which has the largest signal level, to identify the location signal which represents the particular location on the record medium at which that reference signal was recorded, and to determine the recording current level which resulted in that reference signal.

BRIEF DESCRIPTION OF THE DRAWINGS

The following detailed description, given by way of example, will best be understood in conjunction with the accompanying drawings in which:

FIG. 3 is a flow chart of the manner in which the control circuit shown in FIG. 1 carries out the present invention; and FIGS. 4A and 4B are waveform diagrams illustrative of the signal which is recorded by the present invention.

DETAILED DESCRIPTION OF A PREFERRED EMBODIMENT

Figure 1:
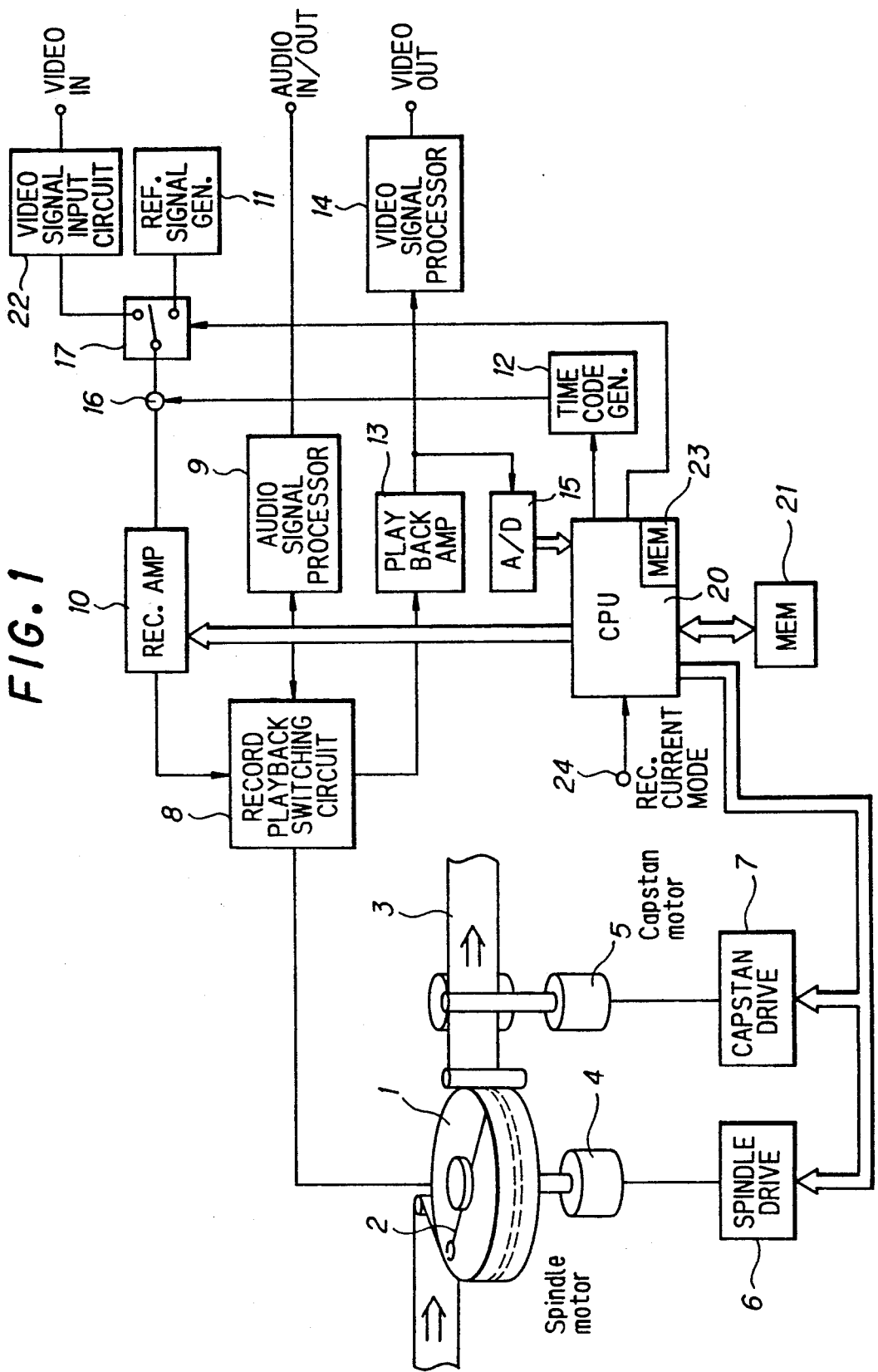
FIG. 1 is a block diagram of recording/reproducing apparatus which incorporates the present invention.

Referring now to FIG. 1, there is illustrated one embodiment of record/playback apparatus which incorporates the present invention. Preferably, this invention is used to determine an optimum recording parameter by which signals are recorded in tracks on a record medium. Such tracks may be longitudinal, as when audio or digital signals are recorded; but in the preferred embodiment, such tracks are slant tracks that are recorded by rotary transducers as such transducers scan successive oblique tracks across the record medium. In the embodiment described herein, the record medium comprises a magnetic tape of the type normally used for the recording of video signals, such as in 8 mm video recorders, or the like, or for the recording of digital audio signals, digital video signals or other information signals. The specific content of the signals which are recorded on the magnetic tape forms no part of the present invention per se. Moreover, and as will be appreciated, the record medium need not be limited solely to a magnetic tape but may constitute other conventional record media, such as magnetic disks, magnetic sheets, or optical recording media. However, in the interest of simplification, the present invention is described in the environment of recording signals on a magnetic tape.

In the illustrated embodiment, a rotating drum 1 has a pair of magnetic heads, or transducers 2 mounted thereon, the drum (and, thus, the heads) being rotatably driven by a spindle motor 4 that is driven by a spindle drive circuit 6. A magnetic tape 3 is deployed about drum 1 with a suitable wrap angle thereabout, such as 180°, and is longitudinally driven by a capstan rotated by a capstan motor 5 under the control of a capstan drive circuit 7. As heads 2 rotate, they scan successive oblique tracks across tape 3. The movement of the tape and the rotation of the heads under the control of capstan drive 7 and spindle drive 6 are controlled by a suitable processor, such as a central processing unit (CPU) shown in FIG. 1 as CPU 20, which may be a programmed microprocessor. It will be appreciated by those of ordinary skill in the art that the drum, heads, tape and controlled motors by which the drum and tape are driven are conventional. As is also conventional, heads 2 constitute record/playback transducers which operate to record signals, such as video signals, in the tracks scanned thereby, or to reproduce signals that had been recorded previously in tracks which are scanned by these heads. If a pair of heads is used, such as shown in FIG. 1, two successive tracks are scanned with each full rotation of drum 1.

Figure 2:
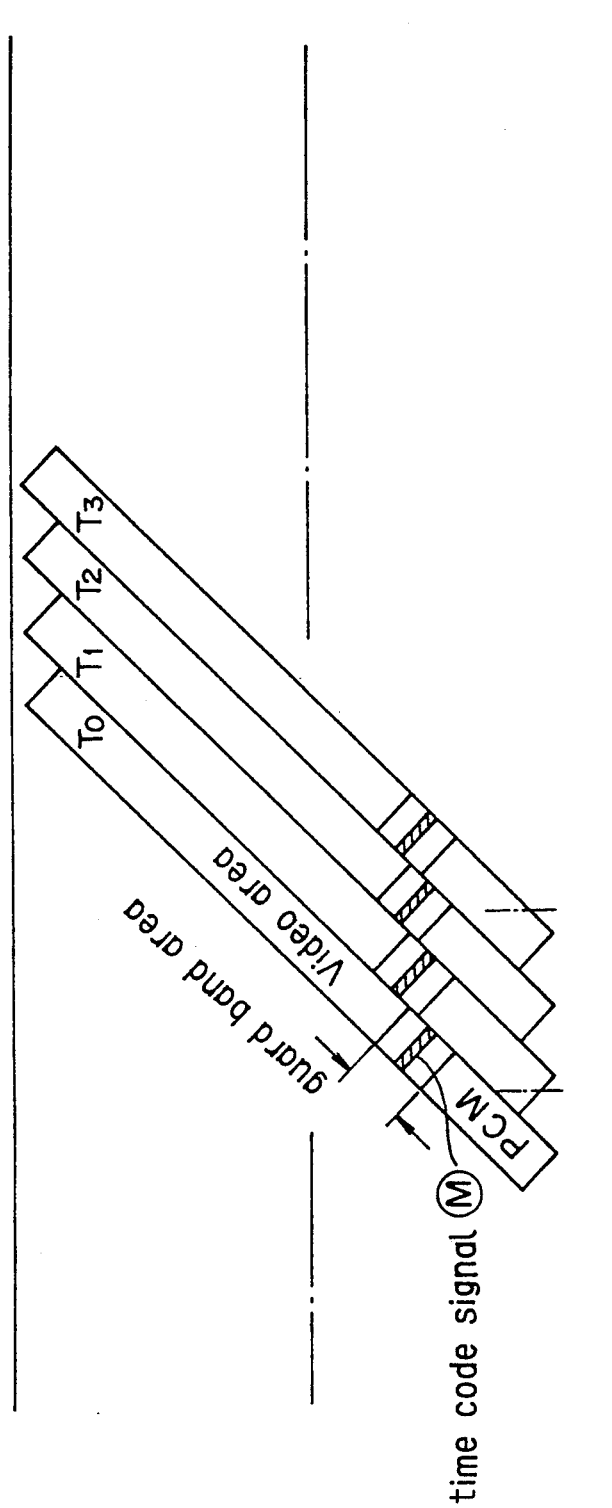
FIG. 2 is a schematic representation of record tracks that are recorded by the apparatus of FIG. 1.

In the embodiment wherein drum 1 and heads 2 are used to record/playback signals in the video 8 mm format, each head records both video signals and audio signals in the track scanned thereby. As shown in FIG. 2, the audio signals are recorded as PCM audio signals in a predetermined portion of the track, generally referred to as the audio area. Thereafter, video signals are recorded by the same head in that portion of the track referred to as the video area. As also illustrated in FIG. 2, the audio and video areas are separated by a guard band area. As is also conventional, an index signal which may be used to represent the tracks scanned by heads 2 also is recorded in the track scanned by a respective head. The index signal, also referred to herein as a location signal, may be a time code signal of the type described in U.S. Pat. No. 4,791,497 or, alternatively, may be a track address signal. It will be appreciated that the location signal, which is recorded in the guard band area shown in FIG. 2, represents the track, or locations, on magnetic tape 3 whereat the PCM and video signals are recorded.

Returning to FIG. 1, heads 2 are coupled to a record/playback switching circuit which is adapted to operate in a record mode to supply signals to heads 2 for recording and in a playback mode to receive signals that are reproduced from tape 3 by the heads. Switching circuit 8 is coupled to an audio signal processor 9, a recording amplifier 10 and a playback amplifier 13. The switching circuit is conventional and supplies audio signals to a head 2 when the head scans the audio area of a track on tape 3, followed by video signals when the head scans the video area. This switching operation typically is controlled as a function of the rotary position of drum 1 which is readily detected.

The audio signal processor is coupled to an audio in/out terminal and is adapted to supply audio signals to record/playback switching circuit 8 during a recording operation. Preferably, the audio signal processor supplies PCM audio signals to the switching circuit and, thus, may include an analog-to-digital (A/D) converter and a suitable PCM encoder. The audio signal processor also includes a PCM decoder and a digital-to-analog (D/A) converter to recover audio signals that are reproduced from tape 3 by heads 2 and supplied thereto by switching circuit 8. The recovered audio signals are supplied as audio output signals to the audio in/out terminal.

Recording amplifier 10 preferably is a controllable amplifier adapted to be supplied with a signal to be recorded, such as a video signal or, as will be described below, a reference signal, and to establish the recording current level with which the supplied signal is recorded. The recording amplifier is coupled to CPU 20 to receive a current level control signal supplied therefrom. In the preferred embodiment, recording amplifier 10 is a variable gain amplifier and is adapted to receive a gain control, or gain setting, signal from the CPU.

The input of recording amplifier 10 is coupled to a combining circuit 16 which, in turn, is coupled to a location signal generator 12 and, by way of a selector switch 17, to either a reference signal generator 11 or a video signal input circuit 22. Combining circuit 16 is adapted to combine the location signal produced by generator 12 and either the reference signal or the video signal selected by selector switch 17 such that the location signal and the reference or video signal are amplified by recording amplifier 10 and recorded in the same track on tape 3 by heads 2. This results in the location signal and either the reference signal or the video signal being recorded in the same track, as shown in FIG. 2.

Location signal generator 12 preferably comprises a time code generator adapted to generate the time code described in U.S. Pat. No. 4,791,497. Of course, any other time code may be generated by generator 12 and, in an alternative embodiment, the generator functions to produce a track address signal. Thus, the time code or address signal serves to identify the track in which the location signal and reference or video signal are recorded. Stated more generally, the location signal thus identifies the particular location on tape 3 at which the reference signal or the video signal is recorded. Location signal generator 12 is coupled to CPU 20 and, as will be described below, is incremented by the CPU in synchronism with the rotation of heads 2, thus identifying each track being scanned by the heads during a recording operation. As an alternative, the location signal may identify selected tracks.

Selector switch 17 is coupled to CPU 20 and is controlled thereby to couple either reference signal generator 11 or video signal input circuit 22 to recording amplifier 10. During a normal video signal recording operation, CPU 20 controls selector switch 17 to couple video signals supplied from a video input terminal through video signal input circuit 22 to the recording amplifier. However, when an optimum recording parameter is to be determined, the CPU controls the selector switch to couple the reference signal generated by the reference signal generator to recording amplifier 10. The reference signal may be any desired reference signal, such as a standard signal normally used for test purposes in recording, a video test pattern, a monotone signal, a color bar signal, or the like. As will become apparent from the description herein, during an optimum parameter determining operation, it is not necessary to limit the recording of the reference signal solely to the reference signal produced by generator 11. Alternatively, a standard, or reference image signal may be supplied to video signal input circuit 22 from the video input terminal; and this reference image signal may be recorded in place of the signal produced by generator 11.

Playback amplifier 13 is adapted to receive from record/playback switching circuit 8 those signals which are recorded in the video area on a track, and also the location signals recorded in the guard band area. Similar to the recording operation, the rotary position of drum 1 controls switching circuit 8 to couple signals reproduced from the audio area of a track to audio signal processor 9 and to couple signals reproduced from the video area of the track to playback amplifier 13. The output of the playback amplifier is coupled to a video signal processor 14 which recovers and supplies the reproduced video signal to a video output terminal. The output of playback amplifier 13 also is coupled to an A/D converter 15 which, during the operation that determines the optimum recording parameter, digitizes the signals supplied thereto. As will be described, during the optimum parameter determining operation, the reference signal which is recorded subsequently is played back and digitized by A/D converter 15. This digitized signal is coupled to CPU 20.

The CPU is programmed to carry out various operations, such as spindle drive control, capstan drive control, and the like. The CPU also is programmed to execute the routine illustrated by the flow chart shown in FIG. 3, whereby the optimum recording parameter is determined. This flow chart is described in detail hereinbelow.

A memory 21, such as a RAM, is coupled to CPU 20 and is adapted to store therein the digitized reference signals reproduced from tape 3 and supplied to the CPU by A/D converter 15. Memory 21 also is adapted to store the location signals which represent the particular tracks from which the reference signals are recovered. The CPU operates to determine which of the reference signals exhibits the highest signal level, to identify the particular track from which this reference signal is reproduced and to determine the recording current level with which that reference signal had been recorded. A current level indicating signal corresponding thereto is stored in a memory section 23 and is used to set the recording current level, or gain, of recording amplifier 10 when the illustrated apparatus next is used to record a video signal (or other information signal) on tape 3. Thus, memory section 23 functions to store the optimum recording parameter that is determined by the CPU.

CPU 20 also is coupled to a mode determining input terminal 24 which is adapted to receive a recording current mode signal when the illustrated apparatus is to be disposed in its optimum recording parameter determining mode. As will be described, the CPU responds to this signal to control selector switch 17 to select reference signal generator 11, to increment location signal generator 12 in synchronism with the rotation of heads 2, and to increment the recording current level with which the reference signal is recorded. This latter function preferably is achieved by incrementing the gain of recording amplifier 10 in synchronism with the incrementing of location signal generator 12.

The manner in which CPU 20 operates to determine the optimum recording parameter now will be described with reference to the flow chart shown in FIG. 3. It will be appreciated that CPU 20 executes the routine represented by this flow chart in response to a recording current mode signal supplied thereto from terminal 24. In this routine, the CPU advances to instruction 102 to set the recording current level $I_N$ to an initial level $I_N = I_0$. This is achieved by supplying a suitable gain control signal from the CPU to recording amplifier 10 which sets this recording current level. Then, the reference signal supplied to the recording amplifier from reference signal generator 11 by way of selector switch 17 is recorded in a track on magnetic tape 3 by head 2. As an example, the reference signal with the recording current level $I_N = I_0$ is recorded in track $T_0$, shown in FIG. 2. This recording operation is represented by instruction 104. It will be appreciated that, in addition to recording the reference signal in track $T_0$, the location signal which identifies track $T_0$, which is assumed herein to be location signal to also is recorded in this track, such as in the guard band area, because the location signal generated by location signal generator 12 is supplied by way of combining circuit 16 to recording amplifier 10 and then via record/playback switching circuit 8 to head 2.

After the recording of the reference signal with the recording current level of $I_0$ and the location signal $t_0$ representing the track $T_0$ in which this reference signal is recorded, CPU 20 advances to instruction 106. Here, the recording current $I_N$ is incremented to a level $I_1$, as by incrementing the gain of recording amplifier 10, and the location signal generated by location signal generator 12 also is incremented to $t_1$. Thereafter, the CPU advances to inquiry 108 to determine if the incremented recording current level is greater than a predetermined amount. If not, the routine returns to instruction 104 such that the new recording current level is used to record the reference signal. However, if inquiry 108 is answered in the affirmative, the recording operation ends. Thus, it will be appreciated that the recording current level, or gain of amplifier 10, is incremented within a predetermined range. Preferably, the recording current level changes monotonically, being increased from a minimum level to a maximum level in the predetermined range. Of course, with each incremental change in the recording current level, the reference signal is recorded in a new track. Therefore, a predetermined number of tracks are used to record the reference signal whose recording current level is incremented over the aforementioned predetermined range.

Although the recording current level is described herein as being incremented from a minimum level to a maximum level within this range, it will be appreciated that, if desired, the recording current level may be decremented from the maximum level to the minimum level. As used herein, the term "increment" is intended to refer to a monotonic change in the recording current level, either upwardly or downwardly.

After the reference signal has been recorded in a number of tracks with different recording current levels as aforedescribed, CPU 20 controls the illustrated apparatus to return to the initial track in which the reference signal was recorded with the initial recording current level so as to carry out a reproducing operation. For example, capstan drive 7 is controlled to rewind tape 3 and record/playback switching circuit 8 is controlled to effect a playback operation. Instruction 110 represents the switch-over to a playback mode.

In this playback operation, the reference signal and location signal that had been recorded in each track are reproduced, supplied to A/D converter 15 whereat they are digitized, and the digitized reference signal and location signal are written into memory 21. Thus, each reference signal that had been recorded with a different recording current level is stored in the memory; and the location signal which represents the track in which the respective reference signal was recorded also is stored. This is represented by instruction 112. After all of the reference signals are stored in memory 21, CPU 20 advances to instruction 114 to detect the maximum signal level of the stored reference signals. Since each reference signal is associated with a location signal, the particular track, or location, in which is recorded the reference signal having the largest reproduced signal level is easily identified, as represented by instruction 116.

Then, the CPU advances to instruction 118 which determines the recording current level that had been used to record the reference signal in the identified track. For example, when the recording operation is executed, the CPU may compile a look-up table in which the recording current level, or gain of recording amplifier 10, is stored as a function of the location signal then being generated by location signal generator 12. This same look-up table may be addressed by the location signal identified as a result of instruction 116, thereby determining the recording current level, or amplifier gain, that had been used to record the reference signal which resulted in the largest playback signal level. As also represented by instruction 118, this determined recording current level is stored in, for example, memory section 23, from which it may be read out during a subsequent recording operation so as to set the optimum recording current level when, for example, a video signal supplied from video signal input circuit 22 is to be recorded.

A graphical representation of the recording of reference signals with different recording current levels in different tracks of magnetic tape 3 is illustrated in FIGS. 4A and 4B. FIG. 4A represents the signal level of the reference signal that is reproduced from a track, referred to simply as the reproducing signal level, and FIG. 4B illustrates the change in the recording current level as the reference signal is recorded in different tracks. In the illustrated example, it is assumed that the location signals are time code signals and, for convenience, are identified as time code signals $t_0, t_1, \ldots$ which serve to identify the tracks in which the reference signal is recorded. FIG. 4B illustrates recording current levels of $I_0, I_1, I_2, \ldots$, and the relationship, or correspondence, between a time code signal $t_n$ and the recording current level $I_n$ is apparent.

From FIG. 4A, it is seen that, as the recording current level increases from $I_0$ to $I_5$, the level of the reference signal reproduced from the magnetic tape likewise increases. However, as the recording current level continues to increase ($I_6, I_7$, etc.), the level of the reference signal that is reproduced now decreases. In accordance with the present invention, the reproduced reference signal having the largest signal level is recorded in the track identified by time code signal $t_5$; and if the aforementioned look-up table is compiled during the recording operation, it is a simple matter simply to address this look-up table with time code signal $t_5$ to obtain therefrom the optimum recording current level $I_5$. It is this recording current level, or amplifier gain, that is stored in memory 23 for future use.

In addition, or as an alternative, to storing the determined recording current level (shown in FIG. 4B as current level $I_5$) in memory section 23, the recording current level may be recorded on magnetic tape 3. If the tape is housed in a cassette which may be removed and subsequently re-loaded into the apparatus shown in FIG. 1, or if this cassette is used by another recording device, the feature of recording, or storing, the optimum recording current level thereon permits recording amplifier 10 to be set easily and quickly such that video, audio and other information signals may be recorded on the tape with optimum recording current level. It will be appreciated that it is a simple matter to read the recording current level signal from tape 3 immediately prior to a recording operation, and to use the recording current level thus read from the tape to set the appropriate gain of recording amplifier 10.

While the present invention has been particularly shown and described with reference to a preferred embodiment, it will be readily appreciated by those of ordinary skill in the art that various changes and modifications may be made without departing from the spirit and scope of the invention. For example, the recording current level of the reference signal need not be changed for each track. Rather, the reference signal with the same recording current level may be recorded in two or more tracks before the recording current level is incremented. Also, although the location signal preferably is recorded as a time code signal in the same track as the reference signal, it will be appreciated that the location signal may be recorded at other locations of the record medium, such as in a longitudinal control track. It is sufficient simply for the location signal to represent the track in which the reference signal is recorded so that, upon playback, the track in which is recorded the reference signal having the largest playback signal level may be identified. Also, although the reference signal has been described as being recorded in successive tracks, it will be appreciated that the reference signal may be recorded in other discrete locations on the record medium, such as longitudinal tracks, blocks, etc.

Therefore, it is intended that the appended claims be interpreted as covering the specific embodiment described herein, those alternatives and variations which have been mentioned above, and all equivalents thereto.

What is claimed is:

1. A method of recording signals with different recording levels on different locations of a record medium, comprising the steps of:
    providing a recording signal to a recording amplifier for recording on said record medium with a recording current level controllable by said recording amplifier;
    selectively changing the recording current level of the signal recorded in different locations on said record medium;
    generating location signals representing the locations on said recording medium whereat said recording signal is recorded; and
    recording said location signals on said record medium.

2. The method of claim 1 wherein said recording signal is recorded with different recording levels in different tracks on said record medium.

3. The method of claim 2 wherein said location signals are recorded in the same tracks as said signals of different recording current levels.

4. The method of claim 3 wherein said tracks are slant tracks and said record medium is a magnetic tape.

5. The method of claim 4 wherein said location signals are time code signals.

6. The method of claim 3 wherein the recording signal is a standard reference signal.

7. The method of claim 3 wherein the recording signal is a reference video signal.

8. The method of claim 3 wherein location signals are supplied to said recording amplifier for recording on record medium.

9. The method of claim 1 wherein the step of changing the recording current level comprises monotonically changing said recording current level as said recording signal is recorded in successive tracks.

10. The method of claim 9 wherein recording amplifier has a controllable gain and the step of monotonically changing said recording current level comprises changing the gain of said recording amplifier.

11. The method of claim 10 wherein said location signals are time code signals and said step of generating location signals comprises generating time code signals which change from track to track; and wherein the gain of said recording amplifier is changed with a respective change in said time code signals.

12. A method of determining optimum recording current level for recording signals on a record medium, comprising the steps of:
    providing a reference signal to a recording amplifier for recording in different locations on said record medium with a controllable recording current level;
    selectively changing the recording current level of the reference signal when said reference signal is recorded in different locations;
    generating location signals representing the different locations on said record medium at which said reference signal is recorded;
    recording said location signals on said record medium;
    reproducing the reference signal and said location signals from said different locations:
    storing the reference signal reproduced from said different locations;
    detecting the stored reference signal whose signal level is the largest;
    identifying the location signal representing a particular record medium location at which the reference signal whose signal level is the largest is recorded; and
    determining the recording current level that had been recorded at said particular location.

13. The method of claim 12 wherein said different locations are different tracks and said step of changing the recording current level of the reference signal comprises changing said recording current level as reference signal is recorded in different tracks.

14. The method of claim 13 wherein said location signals are time code signals.

15. The method of claim 13 wherein said location signals are track address signals.

16. The method of claim 13 wherein said step of changing said recording current level further comprises monotonically changing said recording current level as said reference signal is recorded in successive tracks.

17. The method of claim 16 wherein said recording amplifier has a controllable gain and said step of monotonically changing said recording current level comprises changing the gain of said recording amplifier.

18. The method of claim 13 wherein said location signals are recorded in the same tracks as said reference signal.

19. The method of claim 13 wherein said tracks are slant tracks and said location signals are supplied to said recording amplifier for recording in the same tracks as said reference signal.

20. The method of claim 13 wherein said reference signal is a predetermined video signal.

21. The method of claim 12 further comprising the step of storing a current level indicating signal indicative of said determined recording current level.

22. The method of claim 21 wherein said step of storing comprises recording said current level indicating signal on said record medium for future read out to set the recording current level when signals are to be recorded on said record medium at a future time.

23. The method of claim 12 wherein the step of generating location signals comprises incrementing the location signal when the reference signal is recorded in a different location, and the step of changing the recording current level comprises incrementing said recording current level at a rate substantially equal to the rate at which said location signal is incremented.

24. Apparatus for determining an optimum recording parameter for recording signals on a record medium, comprising:
  controllable recording amplifier means for recording signals on said record medium with controllable gain;
  input means operable to supply a reference signal to said recording amplifier means;
  recording means for recording the reference signal amplified by said recording amplifier means in different locations on said record medium;
  gain control means for controlling the gain of said recording amplifier means to record the reference signal with different gain in respective, different locations;
  location signal means for recording on said record medium location signals representing the different locations in which the reference signal is recorded with different gain;
  reproducing means for reproducing from said record medium the reference signal recorded in different locations with different gain and the location signals;
  storage means for storing the reproduced reference and location signals; and
  control means for detecting the stored reference signal having the largest signal level, for identifying the location signal which represents the location on the record medium at which the reference signal having the largest signal level is recorded, and for determining the gain of said recording amplifier means which resulted in said reference signal having the largest signal level.

25. The apparatus of claim 24 wherein said gain control means includes means for changing the gain of recording amplifier means and means for generating a changing location signal in synchronism with the change in gain of said recording amplifier means.

26. The apparatus of claim 25 wherein said means for changing the gain of said recording amplifier means is operative to increment said gain, and said means for generating a changing location signal is operative to increment said location signal concurrently with the incrementing of said gain.

27. The apparatus of claim 24 wherein said recording means operates to record said reference signal in different tracks on said record medium.

28. The apparatus of claim 27 wherein location signal means includes location signal generating means for incrementing the location signal when reference signal is recorded on a different track; and said gain control means includes gain incrementing means for incrementing the gain of said recording amplifier means substantially concurrently with the incrementing of said location signal.

29. The apparatus of claim 28 further comprising means for coupling said location signal generating means to recording amplifier means for recording the location signal in the same track as the reference signal.

30. The apparatus of claim 29 wherein said location signal is a time code signal.

31. The apparatus of claim 29 wherein said location signal is a track address signal.

32. The apparatus of claim 29 wherein said tracks are slant tracks.

33. The apparatus of claim 24 wherein said reference signal is a predetermined video signal.

34. The apparatus of claim 24 wherein said gain control means includes means for limiting the different gain of recording amplifier means to a predetermined range of gain levels.

35. The apparatus of claim 24 further comprising memory means for storing the determined gain of said recording amplifier means which resulted in the reference signal having the largest signal level, and means for selectively reading out said stored gain to set the gain of recording amplifier means for future recording of signals.

36. The apparatus of claim 35 further comprising video input means for supplying a video signal to be recorded; and selecting means for selectively coupling the reference signal or the video signal to said recording amplifier means for recording.

37. Apparatus for recording signals with different recording current levels on a record medium, comprising:
  input means operable to supply a reference signal for recording;
  recording means for recording the reference signal in different locations on said record medium with different recording current levels;
  current control means for controlling the recording current level of the reference signal recorded in respective, different locations on said, record medium; and
  location signal means for recording on record medium location signals representing the different locations in which the reference signal is recorded with different recording current levels.

38. The apparatus of claim 37 wherein current control means includes means for changing the recording current level of the reference signal which is recorded and means for generating a changing location signal in synchronism with the change in said recording current level.

39. The apparatus of claim 38 wherein means for changing the recording current level of the reference signal is operative to increment said recording current level, and said means for generating a changing location signal is operative to increment said location signal concurrently with the incrementing of said recording current level.

40. The apparatus of claim 37 wherein said recording means operates to record reference signal with different recording current levels in different tracks on record medium.

41. The apparatus of claim 40 wherein location signal means includes location signal generating means for incrementing the location signal when said reference signal is recorded on a different track; and said current control means includes means for incrementing the recording current level of the reference signal substantially concurrently with the incrementing of said location signal.

42. The apparatus of claim 41 further comprising means for coupling said location signal generating means to said recording means for recording the location signal in the same track as the reference signal.

43. The apparatus of claim 42 wherein said location signal is a time code signal.

44. The apparatus of claim 42 wherein location signal is a track address signal.

45. The apparatus of claim 42 wherein tracks are slant tracks.

46. The apparatus of claim 37 wherein reference signal is a predetermined video signal.

47. The apparatus of claim 37 wherein current control means includes means for limiting the different recording current level of the reference signal that is recorded in respective different locations on record medium to a predetermined range of levels.

48. The apparatus of claim 47 further comprising video input means for supplying a video signal to be recorded; and selecting means for selectively coupling the reference signal or the video signal to said recording means for recording.

* * * * *